United States Patent [19]

Nakata et al.

[11] Patent Number: 5,502,505
[45] Date of Patent: Mar. 26, 1996

[54] SPECIAL EFFECT VIDEO APPARATUS FOR ACHIEVING EXTENDED DIMMING AND FADING EFFECTS

[75] Inventors: Tetsuro Nakata; Motomu Ueta, both of Kanagawa, Japan

[73] Assignee: Sony Corporation, Tokyo, Japan

[21] Appl. No.: 219,709

[22] Filed: Mar. 29, 1994

[30] Foreign Application Priority Data

Mar. 30, 1993 [JP] Japan .................................. 5-093858

[51] Int. Cl.⁶ ........................ H04N 5/265; H04N 5/275; G06F 15/00
[52] U.S. Cl. ........................ 348/595; 348/590; 395/122
[58] Field of Search ................... 348/593–595, 348/584, 586, 578; 345/139; 395/130, 122; H04N 5/74, 5/76, 5/272, 5/275, 5/262, 5/265, 5/268

[56] References Cited

U.S. PATENT DOCUMENTS

| | | | |
|---|---|---|---|
| 4,684,990 | 8/1987 | Oxley | 345/139 |
| 4,823,183 | 4/1989 | Jackson et al. | 348/594 |
| 4,875,097 | 10/1989 | Jackson | 345/139 |
| 5,327,177 | 7/1994 | Des Jardins et al. | 345/139 |

FOREIGN PATENT DOCUMENTS

| | | | |
|---|---|---|---|
| 0267553A2 | 5/1988 | WIPO | H04N 5/265 |
| 0531084A2 | 3/1993 | WIPO | G06F 15/72 |
| 2265801A | 6/1993 | WIPO | G06F 15/72 |

*Primary Examiner*—James J. Groody
*Assistant Examiner*—Cheryl Cohen
*Attorney, Agent, or Firm*—Jay H. Maioli

[57] ABSTRACT

During the carrying out of a dim effect, a signal generated at a generator is mixed with a video signal and a matt signal at a mixer, a key signal and background signal are added at an adder, and the resultant signal is outputted. During the carrying out of a fade effect, in similar manner, the signal is mixed with the key signal and a fixed value signal at the mixer, the video signal and background signal are added at the adder, and the resultant signal is outputted. Extended dim effect and extended fade effect give depth to a picture with a color approximation where the depth of the image does not completely merge into the background.

4 Claims, 3 Drawing Sheets

SPECIAL EFFECT VIDEO APPARATUS FOR ACHIEVING EXTENDED DIMMING AND FADING EFFECTS

BACKGROUND

The present invention relates to a special effect apparatus, and particularly to a special effect apparatus which extends dimming effects and fading effects and realizes new effects.

Recently, it has been possible to view on, for example, television programs, signal processed video images which have been curved and wrapped around a background image, and being displayed so as to appear to have been pasted on paper, with this image then appearing to have been turned over in the way that a piece of paper would be turned over.

With this kind of free use of special effects, when a composite image is formed from a background picture and a signal processed picture (i.e. a foreground picture), this composite image is displayed by switching over between these two pictures in accordance with a key signal for inputting. This key signal is generated in accordance with the inputted key signal.

While this composite picture is being constructed, depth data is given, for example, to each of the picture elements, the depth data for the picture elements for the number of pictures which the image is to be composed of is compared, so that processing can then be carried out whereby the picture elements for, for example, the foreground are displayed and the picture elements for the background are concealed. This depth data (known as Z data) is then used for each of the other various special effects.

By using this kind of depth data, if the picture has depth, a dim effect whereby the picture darkens to a certain extent or a fading effect whereby the picture merges into the background can be obtained which can be utilized while the picture is being formed.

A special effects apparatus for carrying out the dim effect and fade effect in the prior art will now be described.

FIG. 1 shows a block diagram of the circuit for carrying out the prior art dim and fade effects. As shown FIG. 1, a signal $G_Z$ which varies between 0 and 1 is generated in the key signal by the $G_Z$ generator 41 using the depth data (Z data). This $G_Z$ signal is given by the following.

$$G_Z = (Z - Z_0) \cdot Z_g \tag{1}$$

For example, when a picture is being formed which will darken with depth, the key signal $G_z$ given by equation (1) is used. In equation (1), Z is the depth data, $Z_0$ is a standard value for the depth data and $Z_g$ is the gain, or the extent to which the picture is dark.

When carrying out the dim effect, the switch 42 is switched to the terminal 43a so that the signal $G_Z$ is inputted to the multiplier 44. This $G_Z$ signal is then multiplied with the video signal $S_V$ inputted via the input terminal 45 (the multiplied signal is taken as being the signal $S_{VG}$). After this, the signal $S_{VG}$, the key signal $S_K$ inputted via the input terminal 46 and the background signal $S_B$ are added together at the mixer 48, and a picture signal which constitutes the carrying out of the dimming effect is outputted via the output terminal 49.

When carrying out the fade effect, the switch 42 is switched to the terminal 43b so that the signal $G_Z$ is inputted to the multiplier 47. This $G_Z$ signal is then multiplied with the key signal $S_K$ inputted via the input terminal 46 (the multiplied signal is taken as being the signal $S_{KG}$). After this, the signal $S_{KG}$, the video signal $S_V$ inputted via the input terminal 45 and the background signal $S_B$ are added together at the mixer 48, and a picture signal which constitutes the carrying out of the fading effect is outputted via the output terminal 49.

The following problems were encountered when the dim and fade effects were carried out using the prior art circuit apparatus.

When carrying out the dim effect, as the signal $G_Z$ and the video signal $S_V$ are simply multiplied together at the multiplier 44, a certain amount of darkening will take place if the depth data for the picture has depth, but if the video signal $S_V$ is at zero when the signal $G_Z$ is at zero, the picture becomes completely black and the desired picture cannot be obtained.

In the same way, when carrying out the fading effect, as the signal $G_Z$ and the key signal $S_K$ are simply multiplied together at the multiplier 47, a certain amount of fading into the background will take place if the depth data for the picture has depth, but if the key signal $S_K$ is at zero when the signal $G_Z$ is at zero, the picture fades completely into the background and the desired picture cannot be obtained.

As the present invention is put forward as a result of the circumstances encountered in the prior art, while the dim effect is being carried out, when the above-described signal $G_Z$ is reflected on the video signal $S_V$, the signal $G_Z$ is not simply multiplied with the video signal $S_V$, but is instead mixed with a matt signal. Also, while the fade effect is being carried out, the signal $G_Z$ is not multiplied with the key signal $S_K$ to become one at the time of reflection, but is instead mixed with a fixed value signal.

It is therefore an object of the present invention to provide a special effects apparatus which, by carrying out the kind of mixing described above, can provide an extended dim effect and an extended fade effect where the dim effect does not become completely dark and the fade effect does not cause the picture to fade completely into the background.

SUMMARY OF THE INVENTION

In order to solve the problems described above, in the present invention, a video special effect apparatus for performing signal processing on an input video signal to impose a special effect on the video signal comprises a mix control signal generating means for generating a mix control signal from depth data set corresponding to the video signal, a first mixing means, to which the video signal and a matt signal showing a predetermined color are supplied, for changing a mixture rate of and outputting the video signal and the matt signal according to the mix control signal, a second mixing means, to which a key signal and a fixed value signal having a value are supplied, for changing a mixture rate of and outputting the key signal and the fixed value signal according to the mix control signal, and a third mixing means, to which a background signal showing a background and an output signal of the first mixing means are supplied, for changing a mixture rate of the background signal and the output signal of the first mixing means according to an output signal of the second mixing means.

Also, the present invention further comprises a switch for selectively supplying the mix control signal to the first mixing means and the second mixing means.

While the key signal generated from the depth data is reflected by the input video signal and the input key signal, rather than simply multiplying these signals, by mixing them it becomes possible to enhance the prior art dim and fade effects.

DRAWINGS

These and other features, aspects and advantages of the present invention will become better understood with reference to the following description, appended claims and accompanying drawings, in which FIG. 1 is a circuit block diagram of the structure of a special effects apparatus of the prior art;

DESCRIPTION

The following is a description with reference to the diagrams of an embodiment of the special effects apparatus for this invention.

Figure 1:
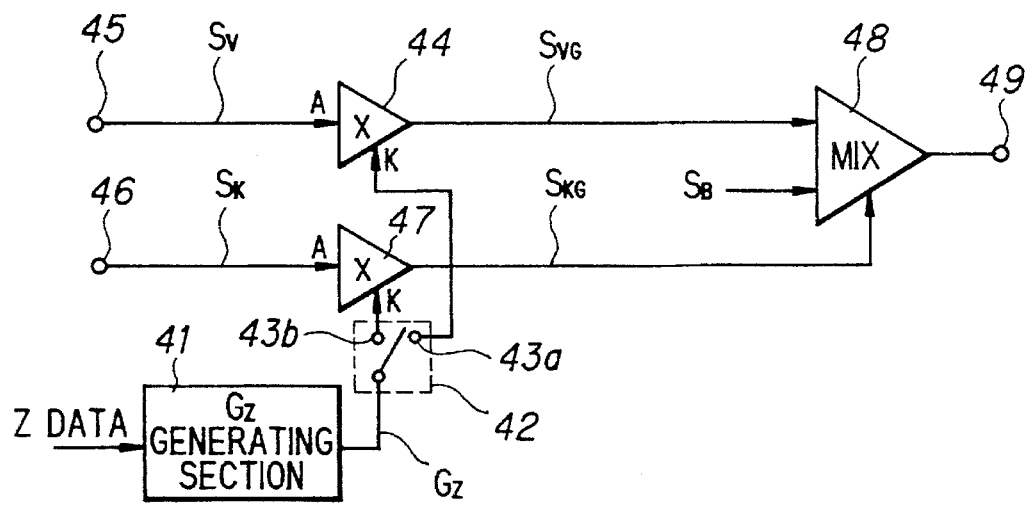
Figure 2:
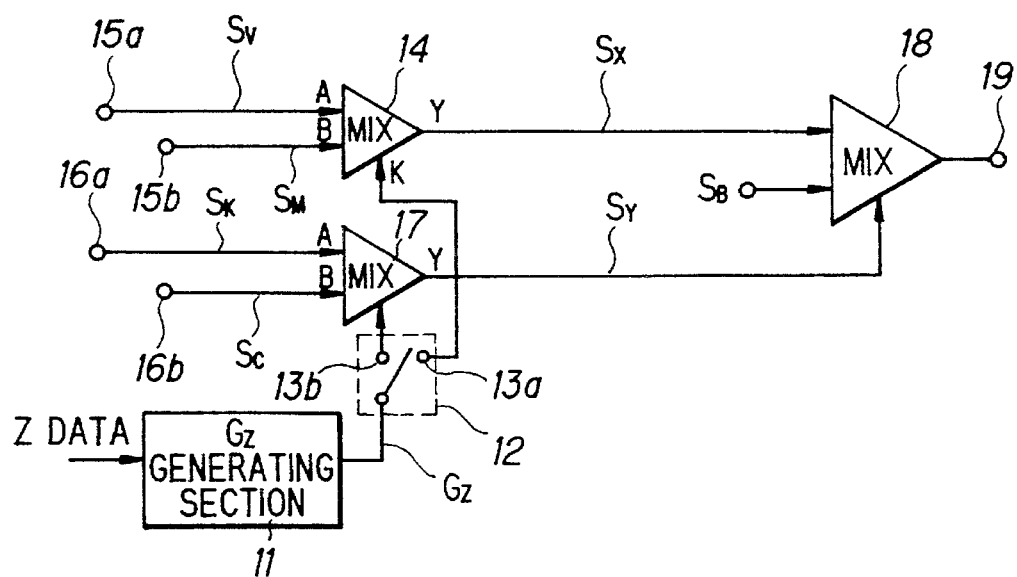
FIG. 2 is a circuit block diagram of the structure of a special effects apparatus for a first embodiment of this invention.
Figure 3:
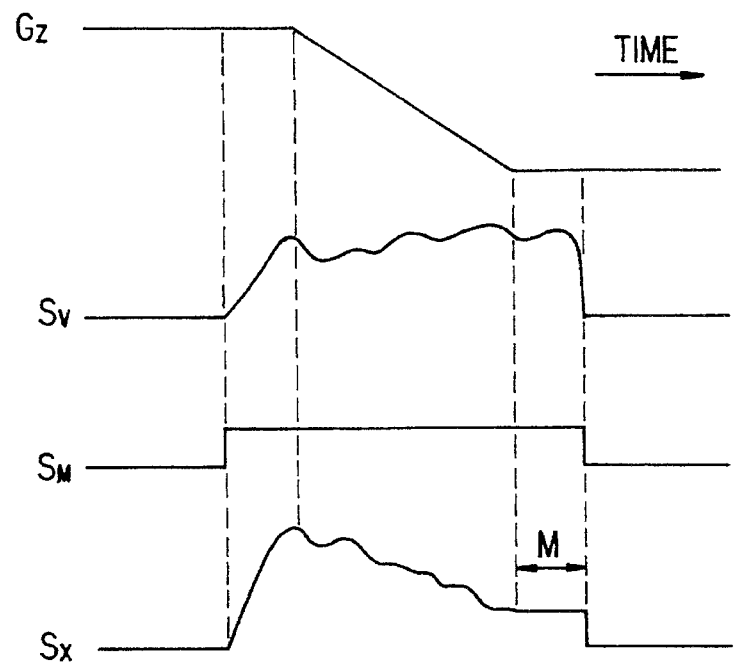
FIG. 3 is a simplified view of each of the signals relating to the extended dim effect in the special effects apparatus in this invention.

As shown in FIG. 2, the $G_Z$ generator 11 generates a $G_Z$ signal having a key signal which varies between 0 and 1, as is shown in the aforementioned equation (1), using the depth data (Z data). When the extended dim effect in this invention is to be carried out, the switch 12 is connected to terminal 13a so that the $G_Z$ signal is inputted to the mixer 14. At this time, the $G_Z$ signal is mixed with the video signal $S_V$ inputted via the input terminal 15a and the matt signal $S_M$ for showing the monochrome present inputted via the input terminal 15b by the mixer 14 and is outputted (this output signal is taken to be the signal $S_X$). This signal $S_X$ is mixed to a value shown by the following equation. FIG. 3 shows a simplified view of the $G_Z$ signal, the video signal $S_V$, the matt signal $S_M$ and the signal $S_X$.

$$S_X = G_Z \cdot S_V + (1 - G_Z) \cdot S_M \qquad (2)$$
$$= (S_V - S_M) \cdot G_Z + S_M$$

After this, the signal $S_X$, the key signal $S_K$ inputted via the input terminal 16a and the background signal $S_B$ are added and a picture signal for carrying out the extended dim effect is outputted via the output terminal 19.

The extended dim effect in this invention will now be explained. With the dim effect in the prior art, the picture was dark to a certain extent depthways, until finally becoming completely dark. However, with the extended dim effect, the picture does not finally become dark but can be made to become an arbitrarily selected color.

This is to say that by mixing the matt signal $S_M$ with the video signal $S_V$ at the mixer 14 in accordance with equation (2), as the value of the $G_Z$ signal generated based on the depth data, which varies between 0 and 1, becomes 0, then according to equation (2), $S_X=S_M$, i.e. only the matt signal $S_M$ is present in the signal $S_X$ during the period M in FIG. 3. It therefore follows that the color indicated by the matt signal $S_M$ is selected. By using this effect, for example, the foreground of the picture going depthways becomes a sepia color, and it is possible to carry out decoloring in the same way.

As shown in FIG. 2, when carrying out the extended fade effect for this invention, the signal $G_Z$ can be inputted to the mixer 17 by connecting the changeover switch 12 to terminal 13b. At this time, the signal $G_Z$ is mixed with the key signal $S_K$ inputted via the input terminal 16a and the fixed value signal $S_C$ showing a constant value inputted via the input terminal 16b by the mixer 14 and then outputted (this output signal is taken to be the signal $S_Y$). The mixed value of this signal $S_Y$ is given by the following equation in the same way as equation (2).

$$S_Y = G_Z \cdot S_K + (1 - G_Z) \cdot S_C \qquad (3)$$
$$= (S_K - S_C) \cdot G_Z + S_C$$

Figure 4:
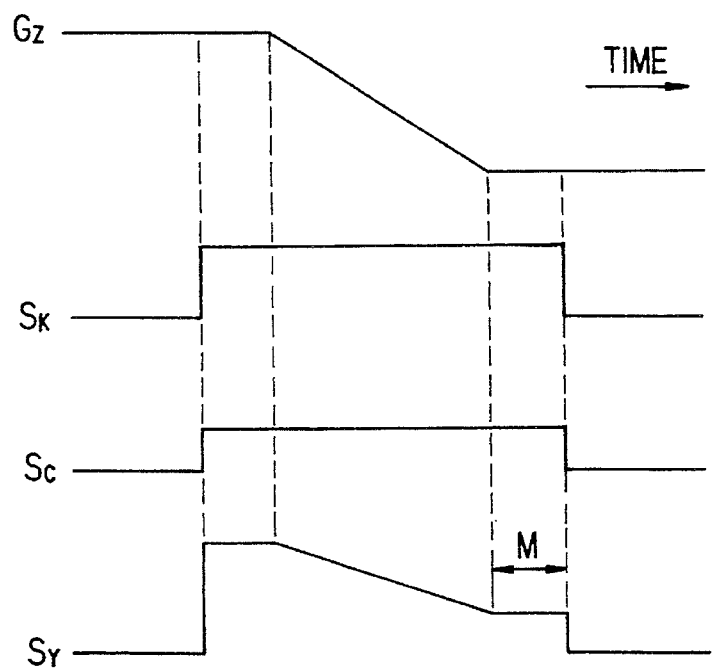
FIG. 4 is a simplified view of each of the signals relating to the extended fade effect for the special effects apparatus in this invention.

After this, the signal $S_Y$, the video signal $S_V$ inputted via the input terminal 15a and the background signal $S_B$ are added together at the adder 18 to be outputted from the output terminal 19 as picture signal for carrying out the extended fade effect. FIG. 4 shows a simplified view of the $G_Z$ signal, the key signal $S_K$, the fixed value signal $S_C$ and the signal $S_Y$.

The extended fade effect for this invention will now be described. In the prior art, the picture blends into the background depthways until it finally blends in completely. By using the extended fade effect, rather than fade completely into the background, it is possible instead to fade while leaving an outline.

This is to say that by mixing the fixed value signal $S_C$ with the video signal $S_K$ at the mixer 17 in accordance with equation (3), as the value of the $G_Z$ signal generated based on the depth data, which varies between 0 and 1, becomes 0, then according to equation (3), $S_Y=S_C$, i.e. only the fixed value signal $S_C$ is present in the signal $S_Y$ during the period M in FIG. 4. It follows that by having a fixed value signal $S_C$ present while the adder 18 is adding, the value of the video signal $S_V$ does not become zero even when the value of the $G_Z$ signal becomes zero, so that any foreground picture will not merge completely with the background. By using this effect, by having, for example, a picture in the foreground to a certain extent in the depth direction, a construction becomes possible whereby this picture will fade into the background, but its outline will not.

Figure 5:
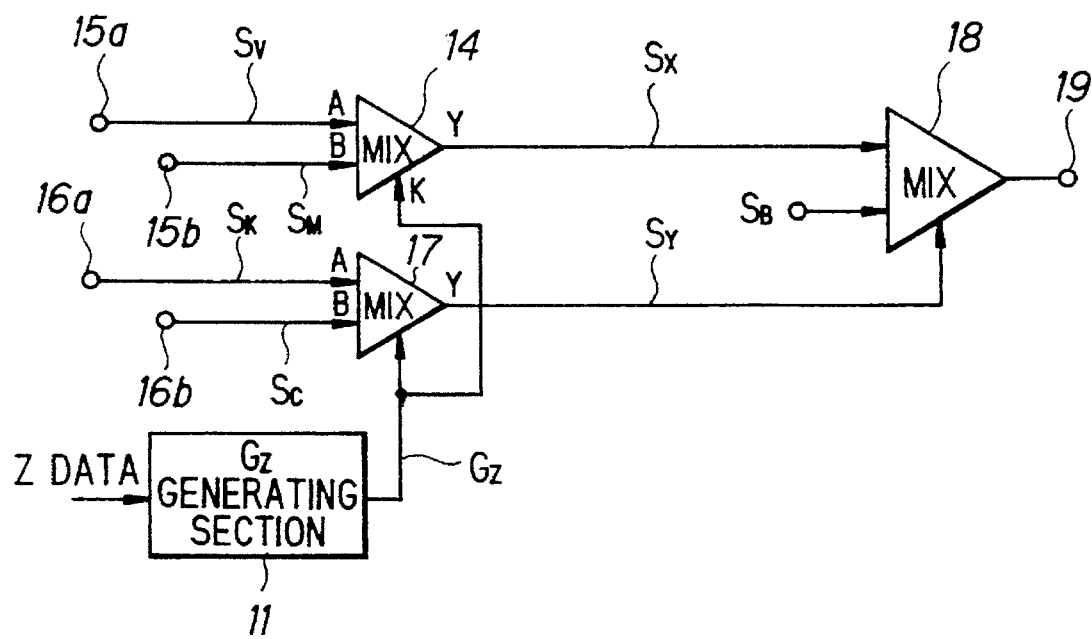
FIG. 5 is a simplified view of the structure of a second embodiment of the special effects apparatus of the invention.

In this embodiment, a changeover switch is used for changing over between the extended dim effect and the extended fade effect. However, terminals 13a and 13b can both be connected to the $G_Z$ generator 11 so that the changeover switch 12 is not used and the extended dim effect and the extended fade effect may be used simultaneously (see FIG. 5). In this way, while a foreground picture is fading into the background, a construction may be adopted whereby rather than fading completely into the background, an outline of the picture in a color indicated by the matt signal $S_M$ will remain.

It is also possible to carry out prior art dim effects and fade effects using the special effects apparatus in this embodiment. This can be achieved by setting the value of the matt signal $S_M$ to zero during the dim effect and by setting the value of the fixed value signal $S_C$ to zero during the fade effect.

By outputting a signal which results from the mixing together of a video signal and a matt signal in accordance with a signal $G_Z$ generated from depth data and/or a background signal in accordance with a key signal while carrying out a dim effect, it is possible to get an approximate image of a foreground picture related to its depth in a particular designated color. On the other hand, by mixing together and outputting a signal resulting from the mixing together of a key signal corresponding to a mixing control signal generated from depth data and a fixed value control signal with a video signal and a background signal corresponding to this resultant signal while a fade effect is being carried out, a foreground picture will not merge completely with the background picture but an outline will instead remain. Also, this apparatus is very economical when compared with the prior art apparatus as the scale of the additional circuitry for ensuring that the overall number of mixers is kept the same as the number of multipliers and can be kept small.

What is claimed is:

1. A video special effect apparatus for processing a special effect on an image corresponding to an input video signal, comprising:

mix control signal generating means for generating a mix control signal based on depth data determined according to the video signal;

first mixing means for receiving the video signal and a matte signal showing a predetermined color and for changing a mixing rate of the video signal and the matte signal according to the mix control signal and outputting an output signal corresponding to the image subjected to an extended dim effect, the output signal representing the predetermined color when the video signal is identical to the matte signal; and second mixing means for receiving a background signal showing a background and the output signal of the first mixing means and for changing a mixing rate of the background signal and the output signal of the first mixing means according to a key signal.

2. A video special effect apparatus for processing a special effect on the image corresponding to an input video signal, comprising:

mix control signal generating means for generating a mix control signal based on depth data determined according to the video signal;

first mixing means for receiving a key signal and a fixed value signal having a constant value and for changing a mixing rate of the key signal and the fixed value signal according to the mix control signal and outputting an output signal; and second mixing means for receiving a background signal showing a background and the video signal and for changing a mixing rate of the background signal and the video signal according to the output signal of the first mixing means to generate a mixed signal corresponding to a processed image subjected to an extended fade effect, the processed image being the background with an outline of the original image when the key signal is identical to the fixed value signal.

3. A video special effect apparatus for processing a special effect on an image corresponding to an input video signal, comprising:

mix control signal generating means for generating a mix control signal based on depth data determined according to the video signal;

first mixing means for receiving the video signal and a matte signal showing a predetermined color and for changing a mixing rate of the video signal and the matte signal according to the mix control signal and outputting a first output signal corresponding to the image subjected to an extended dim effect, the first output signal representing the predetermined color when the video signal is identical to the matte signal;

second mixing means for receiving a key signal and a fixed value signal having a constant value and for changing a mixing rate of the key signal and the fixed value signal according to the mix control signal and outputting a second output signal; and third mixing means for receiving a background signal showing a background and the first output signal and for changing a mixing rate of the background signal and the first output signal according to the second output signal to generate a mixed signal corresponding to a processed image subjected to the extended dim effect and an extended fade effect, the processed image being the background with an outline of the original image when the key signal is identical to the fixed value signal.

4. The video special effect apparatus according to claim 3, further comprising a switch for selectively supplying the mix control signal from the mix control generating means to one of the first mixing means and the second mixing means.

* * * * *

UNITED STATES PATENT AND TRADEMARK OFFICE
CERTIFICATE OF CORRECTION

PATENT NO. : 5,502,505
DATED : March 26, 1996
INVENTOR(S) : TETSURO NAKATA & MOTOMU UETA It is certified that error appears in the above-indentified patent and that said Letters Patent is hereby corrected as shown below:

Col.5, line 26, change "the" to --an--

Signed and Sealed this

Twenty-first Day of October 1997

Attest:

BRUCE LEHMAN

Attesting Officer

Commissioner of Patents and Trademarks